(12) United States Patent
Rieger et al.

(10) Patent No.: US 6,251,518 B1
(45) Date of Patent: Jun. 26, 2001

(54) THERMOPLASTIC ELASTOMER CARBON MONOXIDE/OLEFIN COPOLYMERS

(75) Inventors: Bernhard Rieger; Adnan S. Abu-Surrah; Roland Wursche, all of Ulm (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/297,919
(22) PCT Filed: Nov. 18, 1997
(86) PCT No.: PCT/EP97/06432
§ 371 Date: May 12, 1999
§ 102(e) Date: May 12, 1999
(87) PCT Pub. No.: WO98/23665
PCT Pub. Date: Jun. 4, 1998

(30) Foreign Application Priority Data

Nov. 28, 1996 (DE) ............................................. 196 49 072

(51) Int. Cl.[7] ............................. D02G 3/00; C08G 67/02
(52) U.S. Cl. ........................ 428/364; 528/392; 502/152; 502/154; 502/162; 502/168; 502/170
(58) Field of Search ............................. 528/392; 502/152, 502/154, 162, 168, 170; 428/364

(56) References Cited

U.S. PATENT DOCUMENTS 5,352,767   10/1994   Chien .

FOREIGN PATENT DOCUMENTS

| 19610358 | 9/1997 | (DE) . |
| 516 238 | 12/1992 | (EP) . |
| 2 289 895 | 12/1995 | (GB) . |
| 94/11416 | 5/1994 | (WO) . |
| 96/01690 | 1/1996 | (WO) . |

OTHER PUBLICATIONS

Good, Surface and Colloid Sci. vol. 11, Ex. Meth. 1979.
Makromol Chem. 194, 2579–2603 (1993) 2579.
Abu–Surrah et al., Poly Ketone materials . . . Mac. Chem. Phys., 198, 1197–1208, 1997.

*Primary Examiner*—Samuel A. Acquah
(74) *Attorney, Agent, or Firm*—Keil & Weinkauf

(57) ABSTRACT

Linear, thermoplastic, elastomeric copolymers comprise carbon monoxide and at least one olefinic $C_7$- to $C_{20}$-monomer and have an average molecular weight $M_w$ greater than 15,000 g/mol and a $T_g$-value of less than −20° C., and comprise carbon monoxide, at least one olefinic $C_2$- to $C_4$-monomer and at least one olefinic $C_6$- to $C_{20}$-monomer and have an average molecular weight $M_w$ greater than 40,000 g/mol and a $T_g$-value of less than 20° C.

8 Claims, No Drawings

THERMOPLASTIC ELASTOMER CARBON MONOXIDE/OLEFIN COPOLYMERS

The present invention relates to linear, thermoplastic, elastomeric copolymers of carbon monoxide and at least one olefinic $C_7$- to $C_{20}$-monomer, which have an average molecular weight $M_w$ greater than 15,000 g/mol and a $T_g$-value of less than $-20°$ C.

The present invention furthermore relates to linear, thermoplastic, elastomeric copolymers of carbon monoxide, at least one olefinic $C_2$- to $C_4$-monomer and at least one olefinic $C_6$- to $C_{20}$-monomer, which have an average molecular weight $M_w$ greater than 40,000 g/mol and a $T_g$-value of less than $20°$ C.

The present invention also relates to processes for the preparation of such copolymers, the use of the copolymers for the production of fibers, films, moldings and coatings and to fibers, films, moldings and coatings obtainable from the copolymers.

Carbon monoxide/ethylene copolymers and carbon monoxide/ethylene/propylene terpolymers have very recently attracted interest as engineering plastics for the production of articles having a relatively high melting point, for example gearwheels. As a rule, carbon monoxide copolymers with ethylene as comonomer are very hard and brittle and have poor impact strength or none at all, so that they are unsuitable for many applications in which these properties are desirable.

U.S. Pat. No. 5,352,767 describes alternating, elastomeric copolymers of carbon monoxide and α-olefins, which are prepared with the aid of a catalyst system which contains cationic metal complexes of group VIIIB of the Periodic Table of Elements and activators based on primary and secondary alcohols.

However, the carbon monoxide/propylene, carbon monoxide/n-butene or carbon monoxide/n-hexene copolymers described in said U.S. patent do not have thermoplastic elastomeric properties even at average molecular weights $M_w$ of up to 50,000 and are therefore unsuitable for applications as engineering materials.

According to German Patent Application 196 10 358.4, it is known that the elastomer properties of said copolymers improve with increasing molecular weight. These copolymers are industrially usable in general only at average molecular weights $M_w$ in the region of 80,000 g/mol or higher. However, it would be desirable to be able to realize wide industrial use even in the case of lower molecular weights without, for example, having to accept disadvantages with regard to the processability.

It is an object of the present invention to provide copolymers of carbon monoxide and olefinic monomers, which copolymers have said disadvantages only to a minor degree if at all and can be prepared economically on an industrial scale.

We have found that this object is achieved by linear, thermoplastic, elastomeric copolymers of carbon monoxide and at least one olefinic $C_7$- to $C_{20}$-monomer, which have an average molecular weight $M_w$ greater than 15,000 g/mol and a $T_g$-value of less than $-20°$ C.

We have also found linear, thermoplastic, elastomeric copolymers of carbon monoxide, at least one olefinic $C_2$- to $C_4$-monomer and at least one olefinic $C_6$- to $C_{20}$-monomer, which have an average molecular weight $M_w$ greater than 40,000 g/mol and a $T_g$-value of less than $20°$ C.

We have also found processes for the preparation of linear, thermoplastic, elastomeric copolymers of carbon monoxide and olefinic monomers and the use of the copolymers for the production of fibers, films, moldings and coatings and the fibers, films, moldings and coatings obtainable thereby.

The novel copolymers are composed of units which are based on the monomers carbon monoxide and one or more olefinically unsaturated compounds, ethylene, propylene, 1-butene, 1-pentene and 1-hexene being excluded in binary copolymers.

As a rule, the different monomer units strictly alternate in the novel binary copolymers. In the case of the ternary and higher copolymer systems, the sequence of carbon monoxide and olefin components is as a rule likewise strictly alternating, the relatively long-chain $C_6$- to $C_{20}$-alkene monomers being incorporated essentially randomly in the linear copolymer chain, with regard to the suitable positions for incorporating olefins.

Suitable olefinically unsaturated compounds are in principle all monomers of this class of compounds.

$C_7$- to $C_{20}$-alkenes, in particular $C_7$- to $C_{20}$-alk-1-enes, for example 1-heptene, 1-octene, 1-nonene, 1-decene, 1-dodecene, 1-hexadecene, 1-octadecene and 1-eicosene, are preferably contained in binary carbon monoxide copolymers. $C_8$- to $C_{20}$-alk-1-enes are particularly preferably used.

The average molecular weights $M_w$ of the novel binary carbon monoxide copolymers are usually from 15,000 to 50,000 g/mol, but it is also possible to obtain copolymers having molecular weights of up to 70,000, 100,000 or even 300,000 g/mol.

In the case of average molecular weights $M_w$ (measured by the gel permeation chromatography (GPC) method at $25°$ C. using Microstyragel (Waters) as column material and chloroform as solvent against a polystyrene standard) greater than 15,000 g/mol, $T_g$-values of less than $-20°$ C. are achieved with the novel binary copolymers. The binary copolymers preferably have $T_g$-values of less than $-30°$ C. Depending on the choice of the olefinic comonomer, even $T_g$-values in the region of $-60°$ C. are obtained. The melting points of these copolymers are usually from $-7$ to $45°$ C. Novel copolymers of carbon monoxide and relatively long-chain olefinic monomers, such as 1-octadecene and 1-eicosene, have two melting points, indicating semicrystalline segments in the region of the nonpolar side chains along the linear copolymer chain. By incorporating $^{13}CO$ into binary copolymers with, for example 1-eicosene as an olefin component, it was found that more than 50% of the novel copolymer chains are linked regioselectively head-to-tail.

Suitable olefinic $C_6$- to $C_{20}$-monomers for non-binary copolymers, in particular ternary copolymers, of carbon monoxide, an olefinic $C_2$- to $C_4$-monomer and an olefinic $C_6$- to $C_{20}$-monomer are in particular $C_6$- to $C_{20}$-alk-1-enes, for example 1-hexene, 1-heptene, 1-octene, 1-nonene, 1-decene, 1-dodecene, 1-hexadecene, 1-octadecene or 1-eicosene. 1-Octene, 1-decene, 1-dodecene, 1-hexadecene, 1-octadecene and 1-eicosene are preferably used. 1-Octadecene and 1-eicosene are particularly preferred. Preferably used olefinic $C_2$- to $C_4$-monomers are propylene and buty-1-ene, in particular propylene.

In addition to the abovementioned alkenes, suitable olefinically unsaturated compounds are conjugated or isolated $C_6$- to $C_{20}$-dienes, for example 1,4-hexadiene and 1,5-hexadiene.

Carbon monoxide/propylene/$C_6$- to $C_{20}$-alk-1-ene terpolymers, such as carbon monoxide/propylene/1-decene, carbon monoxide/propylene/1-dodecene, carbon monoxide/propylene/1-hexadecene-, carbon monoxide/propylene/1-octadecene and carbon monoxide/propylene/1-eicosene terpolymers, are preferred. The content of structural units which is based on propylene in the carbon monoxide/propylene/$C_6$- to $C_{20}$-terpolymers is in general from 0.1 to 70, preferably from 5 to 60, in particular from 10 to 50, mol %, based on the terpolymer. Particularly suitable terpolymers having these propylene contents are carbon monoxide/propylene/1-octadecene and carbon monoxide/propylene/1-eicosene terpolymers.

The novel terpolymers have, as a rule, an average molecular weight $M_w$ greater than 40,000 g/mol and a $T_g$-value of less than 20° C., preferably less than −10° C. Terpolymers having an average molecular weight $M_w$ up to 70,000, 170,000, 300,000 and even 500,000 g/mol are also obtainable.

The novel bindery carbon monoxide copolymers and the carbon monoxide/propylene terpolymers are, for example, readily soluble in tetrahydrofuran, toluene, dichloromethane and chloroform.

The molar ratio of carbon monoxide to the sum of the structural units based on the olefinically unsaturated monomers in the novel binary and higher carbon monoxide copolymers is in general 1:1.

The novel copolymers have thermoplastic elastomeric properties.

The molecular weight distribution $M_w/M_n$ (weight average value/number average value) of the novel copolymers, measured by the gel permeation chromatography (GPC) method analogously to the above description, is in general from 1.2 to 3.5, preferably less than 2.5.

The incorporation of relatively long-chain 1-olefin monomer building blocks in, for example, binary and ternary carbon monoxide copolymers also influences the polarity of films, fibers, moldings and coatings obtainable from these copolymers. These materials have lower surface tension than conventional carbon monoxide/ethylene or carbon monoxide/propylene copolymers. Accordingly, hydrophobic material surfaces can be obtained using the novel binary carbon monoxide/$C_8$- to $C_{20}$-alkenes. This property can be determined, for example, with the aid of the sessile drop technique, described in R. J. Good, and R. R. Shomberg, "Surface and Colloid Science", Vol. 11, Experimental Methods, Plenum Press, New York, 1979. For example a Θ-value of 110.27° was obtained for a water drop applied to a film of novel carbon monoxide/1-octene copolymers. Materials having hydrophobic surface behavior can also be made available from the novel carbon monoxide propylene terpolymers. The degree of hydrophobic surface behavior between the limits for pure carbon monoxide/propylene and pure carbon monoxide/relatively long-chain olefin copolymers can be established through the proportion of long-chain olefins in the terpolymer. Polymer film materials obtainable in the terpolymerization of carbon monoxide and propylene with 1-octadecene and containing 13% by weight of 1-octadecene give a Θ-value of 91.3° in the measurement of the contact angle. This value is considerably higher than that for carbon monoxide/propylene copolymers (Θ=83.03°), but lower than that for carbon monoxide/octadecene copolymers (Θ=107.14°). The alkyl side chains may be arranged in a tubular manner around the polar carbon monoxide backbone and thus cause the change from hydrophilic to hydrophobic behavior. The surface polarity of the fibers, films, moldings and coatings obtained can thus be established in accordance with the specific requirements of the application by the choice of the long-chain olefinic monomer and through the proportion of relatively long-chain olefinic monomers which is incorporated into the copolymer.

Owing to their toughening properties and their biocompatible behavior, the novel polymer materials have a wide range of potential uses, for example in polymer blend technology or medical technology.

For the preparation of the novel linear, thermoplastic, elastomeric copolymers carbon monoxide can be copolymerized with olefinically unsaturated compounds in a virtually alcohol-free or anhydrous polymerization medium in the presence of a catalyst whose active material is formed from A) a metal complex of the formula (I)

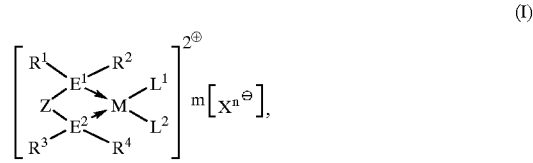

where:
M is a metal of group VIIIB of the Periodic Table of Elements $E^1$ and $E^2$ are each an element from group VA of the Periodic Table of Elements, Z is a bridging structural unit comprising one, two, three or four substructural units of elements of group IVA, VA or VIA of the Periodic Table of Elements, $R^1$ to $R^4$ are substituents selected from the group consisting of organic $C_1$- to $C_{20}$-radicals and $C_3$- to $C_{30}$-organosilicon radicals, it being possible for the radicals to contain an element or a plurality of elements of group IVA, VA, VIA and VIIA of the Periodic Table of Elements, $L^1$ and $L^2$ are formally uncharged Lewis base ligands X is a monovalent or divalent anion m and n are each 1 or 2 and m×n=2 and

B) an activator component which contains a hydroxyl group in the molecule and which is used in an amount of from 0 to 500 mole equivalents, based on M in (I).

A further process for the preparation of the novel linear, thermoplastic or elastomeric copolymers is the copolymerization of carbon monoxide with olefinically unsaturated compounds in a virtually alcohol-free or anhydrous polymerization medium in the presence of a catalyst whose active material is formed from a) a salt of a metal M of group VIIIB of the Periodic Table of Elements, b) a compound or a plurality of compounds selected from the group consisting of the protic acids and Lewis acids, c) a chelate compound of the formula (II)

where:
$E^1$ and $E^2$ are each an element of group VA of the Periodic Table of Elements, Z is a bridging structural unit comprising one, two, three or four substructural units of elements of group IVA, VA or VIA of the Periodic Table of Elements, and $R^1$ to $R^4$ are substituents selected from the group consisting of the organic $C_1$- to $C_{20}$-radicals and $C_3$- to $C_{30}$-organosilicon radicals, it being possible for the radicals to contain an element or a plurality of elements of group IVA, VA, VIA and VIIA of the Periodic Table of Elements, and, d) an activator component B), which contains a hydroxyl group in the molecule and is used in an amount of from 0 to 500 mol equivalents, based on M in (I).

The polymerizations for the preparation of the novel carbon monoxide copolymers can be carried out both batchwise and continuously in the presence of a polymerization catalyst comprising A), or a), b), c) and optionally B) or d).

Suitable polymerization catalysts are metal compounds of the eighth subgroup of the Periodic Table of Elements (VIIIB), which are present as defined metal complexes (I) or can be formed in situ from a metal salt a) of the metals of group VIIIB of the Periodic Table of Elements, protic and/or Lewis acids b) and a chelate compound c) of the formula (II). If required, the activators B) or d) may be added to the metal compounds.

Suitable metals M are the metals of group VIIIB of the Periodic Table of Elements, i.e., in addition to iron, cobalt and nickel, mainly the platinum metals such as ruthenium, rhodium, osmium, iridium and platinum and very particularly palladium. The metals nickel, palladium and platinum are present in general with a formal double positive charge, the metals cobalt, rhodium and iridium in general with a formal single positive charge and the metals iron, ruthenium and osmium in general formally uncharged in the complexes.

Suitable elements $E^1$ and $E^2$ of the chelate ligands, also referred to below as chelate compound (II), are the elements of main group V of the Periodic Table of Elements (group VA), i.e. nitrogen, phosphorus, arsenic, antimony or bismuth. Particularly suitable are nitrogen and phosphorus, in particular phosphorus. The chelate ligand or the chelate compound (II) may contain different elements $E^1$ and $E^2$, for example nitrogen and phosphorus, but it preferably contains identical elements $E^1$ and $E^2$, and in particular $E^1$ and $E^2$ are each phosphorus.

The bridging structural unit Z is an atom group which links the two elements $E^1$ and $E^2$ to one another. The substructural units comprising an atom or a plurality of atoms bonded to one another from the group IVA, VA or VIA of the Periodic Table of Elements usually form the bridge between $E^1$ and $E^2$. Possible free valences of these bridge atoms can be saturated in various ways, for example by substitution by hydrogen or by elements of group IVA, VA, VIA or VIIA of the Periodic Table of Elements. These substituents may form ring structures with one another or with the bridge atom.

Suitable bridging structural units Z are those comprising one, two, three or four elements of group IVA of the Periodic Table of Elements such as methylene (—$CH_2$—), 1,2-ethylene (—$CH_2$—$CH_2$—), 1,3-propylene (—$CH_2$—$CH_2$—$CH_2$—), 1,4-butylene, 1,3-disilapropylene (—$R^5R^6Si$—$CH_2$—$SiR^5R^6$—, where $R^5$ and $R^6$ are each $C_1$- to $C_{10}$-alkyl or $C_6$- to $C_{10}$-aryl), ethylidene ($CH_3(H)C$=), 2-propylidene (($CH_3)_2C$=), diphenylmethylene (($C_6H_5)_2C$=) or ortho-phenylene.

Examples of particularly suitable bridging structural units are 1,2-ethylene, 1,3-propylene and 1,4-butylene.

Suitable organic carbon radicals $R^1$ to $R^4$ are, independently of one another, aliphatic and cycloaliphatic and aromatic radicals of 1 to 20 carbon atoms, for example methyl, ethyl, 1-propyl, 1-butyl, 1-pentyl, 1-hexyl and 1-octyl and their structural analogs. Linear arylalkyl groups having 1 to 10 carbon atoms in the alkyl radical and 6 to 20 carbon atoms in the aryl radical are also suitable, for example benzyl. Further radicals $R^1$ to $R^4$ which may be mentioned are aryl radicals, for example, toluyl, anisyl, preferably ortho-anisyl, xylyl and other substituted phenyl groups, in particular phenyl.

Suitable cycloaliphatic radicals are $C_3$- to $C_{10}$-monocyclic systems, such as cyclopropyl, cyclobutyl, cyclopentyl and cyclohexyl, the last-mentioned one being particularly preferred.

Suitable branched aliphatic radicals are $C_3$- to $C_{20}$-alkyl, preferably $C_3$- to $C_{12}$-alkyl, such as isopropyl, isobutyl, sec-butyl, neopentyl and tert-butyl.

Particularly suitable branched aliphatic radicals are tert-butyl, isopropyl and sec-butyl.

Alkyl groups having a branch lying further outside are also suitable as substituents $R^1$ to $R^4$, such as isobutyl, 3-methyl-but-2-yl and 4-methylpentyl.

$R^1$ to $R^4$ may, independently of one another, also contain atoms from group IVA, VA, VIA or VIIA of the Periodic Table of Elements, for example halogen, oxygen, sulfur, nitrogen or silicon, in this case, for example, bis(trimethylsilyl)methyl. Functional groups which are inert under the polymerization conditions are also suitable in this connection.

Preferred heterosubstituents $R^1$ to $R^4$ are $C_3$- to $C_{30}$-organosilicon radicals, i.e. tetravalent silicon atoms which on the one hand are bonded to $E^1$ or $E^2$ and whose other valences are saturated with three organic carbon radicals, the sum of the carbon atoms of these three radicals bonded to silicon being from three to thirty. Examples are trimethylsilyl, tert-butyldimethylsilyl and tri-phenylsilyl, in particular triamethylsilyl.

1,2-bis(diphenylphosphino)ethane, 1,3-bis(diphenylphosphino)propane and 1,4-bis(diphenylphosphino)butane are preferably used as chelate ligand or chelate compound (II).

Very particularly preferred compounds as chelate ligand or chelate compound (II) are 1,3-bis(diphenylphosphino)propane and 1,4-bis(diphenylphosphino)butane.

Suitable formally uncharged ligands $L^1$ and $L^2$ are in general Lewis bases, i.e. compounds, preferably organic compounds or water, having at least one free electron pair, alkanols or phenols generally being unsuitable.

Lewis bases whose free electron pair or whose free electron pairs is or are present on a nitrogen or oxygen atom, i.e. nitriles, R—CN, ketones, ethers or preferably water, are suitable.

Examples of suitable Lewis bases are $C_1$- to $C_{10}$-nitriles, such as acetonitrile, propionitrile or benzonitrile, or $C_3$- to $C_{10}$-ketones, such as acetone or acetylacetone, or $C_2$- to $C_{10}$-ethers, such as dimethyl ether, diethyl ether or tetrahydrofuran.

Particularly for catalysts which require no activator B) or d), suitable ligands $L^1$ and $L^2$ are those of the formula (III)

$$T\text{—}OH \qquad (III)$$

Here, T is hydrogen or an organic $C_1$- to $C_{15}$-radical provided with a Lewis base group. Suitable organic $C_1$- to $C_{15}$-radicals T are, for example, linear or cyclic —$(CH_2)_n$— units, where n is from 1 to 10, i.e. methylene, 1,2-ethylene, 1,3-propylene, 1,4-butylene, 1,5-pentylene, 1,6-hexylene, 1,7-heptylene, 1,8-octylene, 1,9-nonylene or 1,10-decylene.

Suitable Lewis base groups are ether, ester, ketone, amine, phosphane and in particular nitrile (—C≡N) or tertiary amine.

Suitable compounds T—OH are, for example, water or α,ω-hydroxynitriles, such as NC—$(CH_2)_n$—OH where n is from 1 to 10, or (2-hydroxymethyl)tetrahydrofuran, and (2-hydroxymethyl) (N-organo)pyrrolidines (IIIa) or (2-hydroxymethyl)(N-organo)piperidines (IIIb)

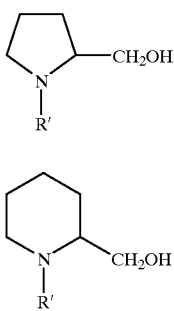

(IIIa)

(IIIb)

where R' is $C_1$- to $C_{10}$-alkyl or $C_3$- to $C_{10}$-cycloalkyl, for example, methyl, ethyl, n-propyl, isopropyl, n-butyl, isobutyl, s-butyl, tert-butyl, cyclopentyl or cyclohexyl. R' may furthermore be $C_6$- to $C_{10}$-aryl, such as phenyl, naphthyl.

In general, the ligands T—OH, except for water, are bonded to the metal M in (I) via the Lewis base group defined above.

Suitable anions X in (I) are, for example, perchlorate, sulfate, phosphate, nitrate, carboxylates, for example acetate, trifluoroacetate, trichloroacetate, propionate, oxalate, citrate and benzoate, and conjugated anions of organosulfonic acids, for example methylsulfonate, trifluoromethylsulfonate and p-toluenesulfonate, and furthermore tetrafluoroborate, tetraphenylborate, tetrakis (pentafluorophenyl)borate, hexafluorophosphate, hexafluoroarsenate or hexafluoroantimonate. Perchlorate, trifluoroacetate, sulfonates, such as methylsulfonate, trifluoromethylsulfonate and p-toluenesulfonate, tetrafluoroborate and hexafluorophosphate are preferably used as anion X, in particular trifluoroacetate, perchlorate or p-toluenesulfonate.

Examples of particularly suitable metal complexes (I) are (bis-1,3(diphenylphosphino)propanepalladiumbisacetonitrile) bis(tetrafluoroborate) (= [Pd(dppp)(NCCH$_3$)$_2$](BF$_4$)$_2$, dppp=1,3(diphenylphosphino)propane), (bis-1,3(diphenylphosphino)propanepalladiumbisaquo) bis(tetrafluoroborate), 1,3 (diphenylphosphino)-propanepalladiumbis(3-hydroxypropionitrile) bis(tetrafluoroborate), (bis-1,4 (diphenylphosphino)butanepalladiumbisacetonitrile) bis (tetrafluoroborate) and (bis-1,4-(diphenylphosphino)butanepalladiumbisaquo) bis(tetrafluoroborate).

The metal complexes of the formula (I) were prepared in general by processes known from the literature, as described in Makromol. Chem. 1993, 194, p. 2579. Usually, tetrakis-ligand metal complexes, such as tetrakis-acetonitrilepalladium bistetrafluoroborate, can be reacted with chelate compounds (II) and the ligands $L^1$ and $L^2$ or TOH to give the metal complexes (I). A preferred process for the preparation of aquo complexes (I) is the reaction of the chelatephosphene-acetonitrile-metal complexes with water. The reaction is carried out in general in a solvent, for example dichloromethane, acetonitrile or water, at from −78 to 40° C.

In the in situ generation of the polymerization catalysts, the metals M are usually used in the divalent state in the form of their salts and are brought into contact with the chelate compound c) of the general formula (II) and the acids b). This can be done before the catalytically active material thus obtainable is brought into contact with the monomer and any further activator d), in general outside the polymerization reactor. The reaction of the individual components metal salt a), chelate compound c) of the formula (II), acid b) and, if required, activator components d) can however also be carried out in the polymerization reactor, in the presence of the monomers.

Suitable salts of usually divalent metals M are halides, sulfates, phosphates, nitrates and carboxylates, such as acetates, propionates, oxalates, citrates and benzoates, and sulfonic acid salts, for example methylsulfonates, trifluoromethylsulfonate and p-toluenesulfonate. Carboxylates, sulfonic acid derivatives and in particular acetates are preferably used.

Particularly suitable catalyst components a) are palladium dicarboxylates, preferably palladium diacetate, palladium dipropionate, palladium bis(trifluoroacetate) and palladium oxalate, and palladium sulfonates, preferably palladium bis (trifluoromethanesulfonate), palladium bis (methanesulfonate) and palladium bis(p-toluenesulfonate), in particular palladium diacetate being used.

Lewis acids and protic acids and mixtures thereof may be used as catalyst components b).

Suitable protic acids b) are strong mineral acids, preferably having a pKa- of less than 3, sulfuric acid and perchloric acid, and strong organic acids, for example trichloroacetic and trifluoroacetic acid and sulfonic acids, methanesulfonic acid, p-toluenesulfonic acid and benzenesulfonic acid.

Furthermore, the acidic salts of strong acids with weak bases, for example ammonium salts of the abovementioned acids, are suitable.

Examples of suitable Lewis acids are halides of the elements of group IIIA of the Periodic Table of Elements, for example boron trifluoride, boron trichloride, aluminum trifluoride and aluminum trichloride, halides of the elements of group VA of the Periodic Table of Elements, such as phosphorus pentafluoride, and antimony pentafluoride, and halides of the metals of the subgroup IVB of the Periodic Table of Elements, such as titanium tetrachloride or zirconium tetrachloride. Further suitable Lewis acids are organically substituted Lewis acids, for example tris (pentafluorophenyl)borane.

Preferably used Lewis acids are boron trifluoride, antimony pentafluoride and tris(pentafluorophenyl)borane.

Particularly preferred components b) are those which have a weakly coordinating conjugated anion, i.e. an anion which forms only a weak bond to the central metal of the complex, such as tetrafluoroborate, hexafluorophosphate, perchlorate, trifluoroacetate, trifluoromethylsulfonate, p-tosylate and borates, such as pyrocatecholatoborate and tetraarylborate, a suitable aryl group being in particular 2,5-dimethylphenyl, 2,5-ditrifluoromethylphenyl or pentafluorophenyl.

Other suitable catalyst components a) and b) are those generally known for systems with bisphosphines from EP-A 501 576 and 516 238.

Catalyst systems contain, as component c), a chelate compound $R^1R^2E^1$—Z—$E^2R^3R^4$ (II), which has already been described in the discussion of the metal complexes (I).

The ratio of the catalyst components a), b) and c) to one another is chosen in general so that the molar ratio of the metal compound a) to acid b) is from 0.01:1 to 100:1, preferably 0.1:1 to 1:1, and the molar ratio of the metal compound a) to the component c) is from 0.01:1 to 10:1, preferably from 0.1:1 to 2:1.

The activator component B) or d) is as a rule a chemical compound which contains at least one hydroxyl group in the molecule. This includes in particular $C_1$- to $C_{10}$-alcohols, such as methanol, ethanol, n-propanol, isopropanol, n-butanol, isobutanol, sec-butanol, tert-butanol, n-hexanol, n-octanol, n-decanol, cyclohexanol, phenol and water. Methanol and/or water are preferably used as activator component B) or d).

The molar ratio of activator component B) or d) to metal M is from 0 to 500, preferably from 0 to 300. It has proven advantageous not to exceed the maximum ratio in the polymerization reaction, since otherwise the average molecular weights Mw of the carbon monoxide copolymers may be too low.

The addition of the activator B) or d) is superfluous only when the catalyst contains, as Lewis base ligands $L^1$, $L^2$ those which contain a hydroxyl group in the molecule and which have been defined more exactly above by the formula T—OH (III).

Pressures of from 100 to 500,000, are preferably from 500 to 350,000 and in particular from 1000 to 10,000, kPa, at temperatures from −50 to 400° C., preferably from 10 to 250° C. and in particular from 20 to 100° C. have proven suitable reaction parameters for the preparation of linear, thermoplastic, elastomeric copolymers from carbon monoxide and olefinically unsaturated compounds.

The polymerization reactions can be carried out in the gas phase in a fluidized bed or with stirring, or in suspension, in liquid and in supercritical monomers and in the solvents which are inert under the polymerization conditions.

The polymerization reactions can be carried out in a virtually alcohol-free or anhydrous polymerization medium. This means that, except for possibly the activator component B) or d), no further amount of alcohol or water was or is added to the reaction mixture comprising monomers, catalysts, and, if required, inert solvent or suspending medium.

Suitable inert solvents and suspending media are those which contain no hydroxyl group in the molecule, i.e. ethers, such as diethyl ether or tetrahydrofuran, aromatic solvents, such as benzene, toluene, ethylbenzene or chlorobenzene, aliphatic hydrocarbons, such as isobutane, or chlorinated aliphatic hydrocarbons such as dichloromethane or 1,1,1-trichloromethane, or mixtures of said compounds.

Initially taking the catalyst in the inert solvent, if required subsequently adding the activator component B) or d) and then adding the monomers and effecting polymerization at from 20 to 100° C. and from 1000 to 10,000 kPa have proven to be a suitable polymerization process. Under the polymerization conditions described, spiroketal formation was not observed.

The novel carbon monoxide copolymers can be processed by means of injection molding, blow molding, spinning, rotation molding, extrusion or spin coating. It is also possible to coat metallic, ceramic and other surfaces, for example those of plastics materials.

Novel carbon monoxide copolymers which are suitable for the production of fibers, films, moldings and coatings are in particular those which are intended to be tough. Furthermore, they can be used as mixing components in plastics, in particular in those which are intended to be tough. In particular, the carbon monoxide/propylene terpolymers described also provide an economical route to molding materials having a thermoplastic elastomeric property profile.

EXAMPLES

General Polymerization Conditions

I. Binary Carbon Monoxide Copolymers 100 ml of dichloromethane and 35 mg (0.045 mmol) of the palladium compound [Pd(dppp)(NCCH$_3$)$_2$](BF$_4$)$_2$, and 0.25 ml (6.2 mmol) of methanol were initially taken at a 0.3 l steel autoclave. A mixture of olefin (20 g) and carbon monoxide (82,0×10$^5$ Pa) was then polymerized at 25° C. for 72 hours.

The temperature and the partial pressures of the monomers were kept constant during the entire duration of the reaction. The polymerization was stopped by reducing the pressure to ambient pressure, methanol was added to the reaction mixture, the mixture was filtered, the solvent was removed from the filtrate and the polymer was isolated. For further purification, the product was dissolved in dichloromethane (100 ml) and filtered over a short silica gel column. The experimental parameters and the polymer properties are as shown in Table 1.

Carbon monoxide/hept-1-ene Copolymer (Hp-CO)
(Example 1)

$^1$H-NMR (CDCl$_3$): δ=0.85 (t, —CH$_3$, 3H); 1.10–1.70 (broad, —(CH$_2$)$_4$, 0H), 2.30–2.65 (broad, —CH, 1H); 2.70–3.20 (broad, —CH$_2$, 2H).

$^{13}$C-NMR: δ=13.8; 22.2–23.4; 26.1–26.5; 28.7–31.7; 43.0–44.5; 45.0–46.0; 207–209; 211–213; 214–215.

(C$_8$H$_{14}$O)$_n$ (126.19)$_n$: Calc. C, 76.14; H, 11.2. Found. C, 76.93; H, 11.65.

Carbon monoxide/oct-1-ene Copolymer (Oc-CO)
(Example 2)

$^1$H-NMR (CDCl$_3$): δ=0.85 (t, —CH$_3$, 3H), 1.17–1.70 (broad, —(CH$_2$)$_5$, 10H), 2.39–2.60 (broad, —CH, 1H), 2.80–3.10 (broad, —CH$_2$, 2H).

$^{13}$C-NMR: δ=13.9, 22.4, 26.9, 29.2, 30.0–3.15, 42.0–43.6, 44.2–45.5, 207.1–208.4, 211.6–212.9, 213.5–214.8. (C$_9$H$_{16}$O)$_n$ (140.22)$_n$: Calc. C, 77.09; H, 11.50. Found. C, 77.40; H, 11.68.

Carbon monoxide/dodec-1-ene Copolymer (Dd-CO)
(Example 3)

$^1$H-NMR (CDCl$_3$): δ=0.80 (t, —CH$_3$, 3H), 1.20–2.00 (broad, —(CH$_2$)$_{10}$, 10H), 2.20–2.60 (broad, —CH, 1H), 2.80–3.10 (broad, —CH$_2$, 2H).

$^{13}$C-NMR: δ=14.0, 22.6, 26.3–27.9, 28.3–29.5, 31.8, 42.0–43.5, 44.0–45.5, 207.0–209.0, 211.5–212.5. 213–215.

(C$_{13}$H$_{24}$O)$_n$ (196.33)$_n$: Calc. C, 79.53; H, 12.32. Found. C, 78.62; H, 12.60.

Carbon monoxide/hexadec-1-ene Copolymer
(Hd-CO) (Example 4)

$^1$H-NMR (CDCl$_3$): δ=0.90 (broad, —CH$_3$, 3H), 1.10–2.00 (broad, —(CH$_2$)$_{13}$, 26H), 2.15–2.60 (broad, —CH, 1H), 2.81–3.22 (broad, —CH$_2$, 2H). $^{13}$C-NMR: δ=12.0, 20.0, 22.7, 27.1–31.4, 42.0–44.0, 45.0–46.0, 207.0 (broad), 212.0 (broad), 215.8 (broad) (C$_{17}^H{}_{32}$O)$_n$ (252,44)$_n$: Cal. C, 80.89; H, 12.78. Found. C, 81.23; H, 13.39.

Carbon monoxide/octadec-1-ene Copolymer
(Od-CO) (Example 5)

$^1$H-NMR (CDCl$_3$): δ=0.85 (t, 3H, —CH$_3$), 1.22–1.80 (broad, (CH$_2$)$_{15}$, 30H), 2.20–2.60 (broad, —CH, 1H), 2.80–3.20 (broad, —CH$_2$, 2H).

$^{13}$C-NMR: δ=14.1, 22.7, 27.1, 28.9–31.4, 31.9, 33.8, 41.2–42.5, 43.5–44.6, 207.0 (broad), 212.0 (broad), 214.8 (broad).

(C$_{19}$H$_{36}$O)$_n$ (280.49)$_n$: Calc. C, 81.36; H, 12.94. Found. C, 81.75; H, 12.92.

Carbon monoxide/eicos-1-ene Copolymer (Ei-CO)
(Example 6)

$^1$H-NMR (CDCl$_3$): δ=0.85 (t, 3H, —CH$_3$), 1.22–1.80 (broad, (CH$_2$)$_{15}$, 30H), 2.20–2.60 (broad, —CH, 1H), 2.80–3.20 (broad, —CH$_2$, 2H).

$^{13}$C-NMR: δ=14.1, 22.7, 27.1 28.9–31.4, 31.9, 33.8, 42.0–43.6, 44.2–45.6, 207.5–208.5, 211.4, 213.0, 214.0–215.2. $(C_{21}H_{40}O)_n$ $(308.55)_n$: Calc. C, 81.22; H, 13.63. Found. C, 82.15; H, 13.65.

Copolymerization of $^{13}$CO with eicos-1-ene

Prepared by the same process as described above, with constant $^{13}$CO-partial pressure and a reaction time of 24 h. $^{13}$C-NMR (CDCl$_3$): carbonyl-range δ=209.0–210.9, 211.7–212.6, 213.8–215.2 ppm. $M_w$=6.9×10$^3$ g/mol, $M_w/M_N$=1.44.

II. Ternary Carbon Monoxide Copolymers 100 ml of dichloromethane, 0.25 ml of methanol and 35 mg (0.045 mmol) [Pd(dppp)(NCCH$_3$)$_2$] (BF$_4$)$_2$ and 10 g of 1-octadecene or 1-eicosene were initially taken as 0.3 l steel autoclave. 40 g of propylene or ethylene (10.5×10$^5$ Pa) and carbon monoxide (82.0×10$^5$ Pa) were fed in and polymerized with mechanical stirring for 48 h at 25° C. The temperature and the partial pressures of the monomers were kept constant during the entire duration of the reaction. The polymerization was stopped by reducing the pressure to ambient pressure and by adding an excess of methanol. The reaction mixture was filtered, the solvent was removed from the filtrate and the polymer was isolated, washed with methanol (200 ml), filtered, and dried under reduced pressure. The further experimental parameters and the polymer properties are as shown in Table 2.

Carbon monoxide/propylene/octadec-1-ene-terpolymer 1 (ODPCO 1) (Example 7)

$^1$H-NMR (CDCl$_3$): δ=0.80 (t, —CH$_3$ (Od-CO)), 1.00 (broad, —CH$_3$, (P—CO)), 1.12–1.99 (broad), 2.29–2.50 (broad), 2.89–3.15 (broad).

$^{13}$C-NMR: δ=14.1, 16.9, 22.4, 22.7, 28.9–29.9, 31.7, 33.7, 40.1 (broad), 44.5 (broad), 207.0 (broad), 211.8 (broad), 214.8 (broad).

Carbon monoxide/propylene/octadec-1-ene-terpolymer 2 (ODPCO 2) (Example 8)

$^1$H-NMR (CDCl$_3$): δ=0.77 (t, —CH$_3$ (Od-CO)), 1.00 (broad, —CH$_3$ (P—CO)), 1.10–2.0 (broad), 2.30–2.40 (broad), 2.80–3.15 (broad).

$^{13}$C-NMR: δ=13.9, 16.3, 22.4, 22.7, 28.9–29.9, 31.8, 33.7, 41.2 (broad), 44.6 (broad), 207.4 (broad), 211.9 (broad), 215.4 (broad).

Carbon monoxide/propylene/eicos-1-ene-terpolymer (EiPCO) (Examples 9 and 10)

$^1$H-NMR (CDCl$_3$): δ=0.77 (—CH$_3$), PCO), 1.00 (broad, 3H, Od-CO—H$_3$), 1.12–1.99 (broad), 2.29–2.50 (broad), 2.89–3.15 (broad).

The molecular weights $M_w$ and the molecular weight distributions $M_w/M_n$ were determined by gel permeation chromatography (GPC), based on a polystyrene standard.

$^1$H-NMR and $^{13}$C-NMR-measurements were carried out using the Bruker AMX 500 or AC 200 spectrometer.

IR-measurements were carried out on the Bruker IFS66V spectrometer.

The DSC data were determined using the Perkin-Elmer DSC-7 apparatus at a heating rate of 10° C./min.

The melting points were likewise determined with the aid of a polarization microscope. The heating rate was set at 10° C./min.

The contact angle measurements on water drops (bidistilled, γN=72 mN/m) applied to films of copolymer material were carried out by the sessile drop technique using a G 40 goniometer from Krüss, Hamburg, which was equipped with a video system, an image processor (G 1041) and the PDA 10 software.

The copolymer films were produced from solution (1.0% w/w-, CH$_2$Cl$_2$) by evaporating the solvent on a rotating glass sheet (spin-casting) at 15 to 25° C. (for carbon monoxide/ethylene copolymers, a 0.5% w/w solution in 1,1,1,3,3,3-hexafluoro-2-propanol was used). The solvent residues were removed by evacuation for one hour. For the contact angle measurement, the tangent method at 20° C. was used (cf. R. J. Good and R. R. Shomberg, "Surface and Colloid Science", Vol. 11, Experimental Methods, Plenum Press, New York, 1979). The contact angle was determined on a drop with a measured frequency of 1 Hz over 5 seconds. The values described are mean values of 15 individual measurements on three drops altogether. The accuracy of measurement was in the range of ±2.0°.

TABLE 1

Copolymerization of carbon monoxide with 1-alkenes[a]

| Example | Copolymer | 1-Alkene | $M_w$[b] (g/mol) | $M_w/M_n$[b] | vC=O (cm$^{-1}$) | $T_g$[d] (° C.) $T_m$° C., ($\Delta H_f$J/g)[d] | Yield (g) |
|---|---|---|---|---|---|---|---|
| 1 | Hp-CO | 1-Heptene | 2.8 × 10$^4$ | 1.69 | 1705 | −24.0 −7.0 (broad)[f] | 2.6 |
| 2 | Oc-CO | 1-Octene | 2.9 × 10$^4$ | 1.76 | 1705 | −33.0 —[e] | 2.5 |
| 3 | Dd-CO | 1-Dodecene | 1.9 × 10$^4$ | 1.78 | 1711 | −59.8 —[e] | 1.6 |
| 4 | Hd-CO | 1-Hexadecene | 2.3 × 10$^4$ | 1.68 | 1712 | —[e] 13.0[f] | 1.3 |
| 5 | Od-CO | 1-Octadecene | 2.6 × 10$^{4c)}$ | 1.53[c] | 1709 | —[e] 19.3, 32.3 (103) | 8.5 |
| 6 | Ei-CO | 1-Eicosene | 2.1 × 10$^{4c)}$ | 1.67[c] | 1707 | —[e] 28.9 (51.0), 41.2 (65.8) | 8.0 |

[a] Polymerization conditions: solvent: dichloromethane (100 ml); activator (methanol)/Pd-molar ratio: 140/1; polymerization temperature: 25° C.; carbon monoxide partial pressure: 82.0 × 10$^5$ Pa; 1-alkene: 20 g; reaction time: 72 h.
[b] Determined by means of GPC (with polystyrene as reference standard).
[c] Confirmed by further analysis systems (differential refractometer, Water Model 510; differential viscometer, Viscothek Model H 502, GPL Win-Software): Od-CO: $M_w$ ($M_w/M_n$) = 6.9 × 10$^4$ (1.88); Ei-CO: $M_w$ ($M_w/M_n$) = 5.7 × 10$^4$ (1.97).
[d] Glass transition temperature ($T_g$), melting point [$T_m$] enthalpy of fusion ($\Delta H_f$) (determined from the second run with the aid of the tangent method.
[e] Not determined.
[f] Determined by polarization microscopy (Example 1: heating rate 30° C./min).

TABLE 2

Terpolymerization examples[a]

| Ex. | Terpolymer | Amount of $C_{18}$-/$C_{20}$-1-alkene starting material (g) | $M_w$[b] (g/mol) | $M_w/M_n$[b] | vC=O (cm$^{-1}$) | $T_g$ (° C.)[d] | [$T_m$ ° C., ($\Delta H_f$J/g)][d] | Proportion of $C_{18}$-/$C_{20}$-1-alkene (mol-%)[f] | Yield (g) |
|---|---|---|---|---|---|---|---|---|---|
| 7 | OdPCO 1 | 5.0 | 1.63 × 10$^5$ | 1.84 | 1714 | 19.3 | 81.0 (20.7) | 13.0 | 8.0 |
| 8 | OdPCO 2 | 14.0 | 6.83 × 10$^4$ | 1.43 | 1708 | −15.4 | 12.9 (66.0) | 30.0 | 10.0 |
| 9 | EiPCO | 10.9 | 5.66 × 10$^4$ | 1.90 | 1705 | —[c] | 9.12 (16.5); 33.0 (118.0) | 21.0 | 2.0 |
| 10 | OdECO | 10.0 | —[c] | —[c] | 1691 | —[e] | 84.52 (24.9), 185 (20.8) | —[c] | 5.5 |

[a] Polymerization conditions: solvent: dichloromethane (100 ml); activator (methanol)/Pd-molar ratio: 140/1; polymerization temperature: 25° C.; carbon monoxide partial pressure: 82.0 × 10$^5$ Pa; 1-alkene: 40 g; ethylene partial pressure 10.5 × 10$^5$ Pa; reaction time: 48 h.
[b] Determined by means of GPC (with polystyrene as reference standard).
[c] The polymer is insoluble.
[d] Glass transition temperature ($T_g$), melting point ($T_m$), enthalpy of fusion ($\Delta H_f$) (determined from the second run with the aid of the tangent method).
[e] Not determined.
[f] Calculated on the basis of the $^1$H-NMR spectra.

We claim:

1. A linear, thermoplastic, elastomeric copolymer of carbon monoxide, at least one olefinic $C_2$- to $C_4$-monomer and at least one olefinic $C_6$- to $C_{20}$-monomer, which has an average molecular weight $M_w$ greater than 163,000 g/mol and a $T_g$ value of less than 20° C.

2. A linear, thermoplastic, elastomeric copolymer as claimed in claim 1, wherein the olefinic $C_2$- to $C_4$-monomer used is propylene.

3. A process for the preparation of a linear, thermoplastic, elastomeric copolymer of carbon monoxide and at least one olefinic $C_7$- to $C_{20}$-monomer having an average molecular weight $M_w$ greater than 15,000 g/mol and a Tg value of less than −20° C., wherein the copolymerization of carbon monoxide with olefinic monomers is carried out in a virtually alcohol-free or anhydrous polymerization medium in the presence of a catalyst whose active material is formed from A) a metal complex of the formula (I)

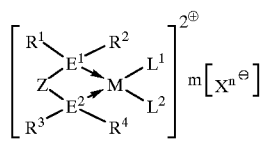

where:
M is palladium
$E^1$ and $E^2$ are each phosphorus
Z is methylene, 1,2-ethylene, 1,3-propylene, 1,4-butylene, 1,3-disilapropylene, ethylidene, 2-propylidene, diphenylmethylene or ortho-phenylene,
$R^1$ to $R^4$ are substituents selected from the group consisting of $C_1$- to $C_{20}$-organocarbon radicals and $C_3$- to $C_{30}$-organosilicon radicals, it being possible for the radicals to contain an element or a plurality of elements of group IVA, VA, VIA and VIIA of the Periodic Table of Elements,
$L^1$ and $L^2$ are formally uncharged Lewis base ligand
X is perchlorate, sulfate, phosphate, nitrate, carboxylate, conjugated anions of organosulfonic acid, tetrafluoroborate, tetraphenylborate, tetrakis(pentafluorophenyl)borate, hexafluorophosphate, hexafluoroarsenate or hexafluoroantimonate,
m and n are each 1 or 2
and m×n=2 and B) an activator component which contains a hydroxyl group in the molecule and which is used in an amount of from 0 to 500 mole equivalents, based on M in (I)
wherein the individual catalyst components are brought into contact to generate the catalyst before the catalyst is brought into contact with the monomers.

4. A process for the preparation of a linear, thermoplastic, elastomeric copolymer of carbon monoxide, at least one olefinic $C_2$- to $C_4$-monomer and at least one olefinic $C_6$- to $C_{20}$-monomer, wherein the copolymerization of carbon monoxide with olefinic monomers is carried out in a virtually alcohol-free or anhydrous polymerization medium in the presence of a catalyst whose active material is formed from A) a metal complex of the formula (I)

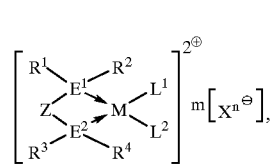

where:
M is palladium
$E^1$ and $E^2$ are each phosphorus
Z is methylene, 1,2-ethylene, 1,3-propylene, 1,4-butylene, 1,3-disilapropylene, ethylidene, 2-propylidene, diphenylmethylene or ortho-phenylene,
$R^1$ to $R^4$ are substituents selected from the group consisting of $C_1$- to $C_{20}$-organocarbon radicals and $C_3$- to $C_{30}$-organosilicon radicals, it being possible for the radicals to contain an element or a plurality of elements of group IVA, VA, VIA and VIIA of the Periodic Table of Elements,
$L^1$ and $L^2$ are formally uncharged Lewis base ligands
X is perchlorate, sulfate, phosphate, nitrate, carboxylate, conjugated anions of organosulfonic acid, tetrafluoroborate, tetraphenylborate, tetrakis(pentafluorophenyl)borate, hexafluorophosphate, hexafluoroarsenate or hexafluoroantimonate, m and n are each 1 or 2 and m×n=2 and

B) an activator component which contains a hydroxyl group in the molecule and which is used in an amount of from 0 to 500 mole equivalents, based on M in (I).

5. A process as claimed in claim 4, wherein the carbon monoxide copolymer has an average molecular weight $M_w$ greater than 68,000 g/mol.

6. A fiber, film, molding or coating produced from a carbon monoxide copolymer obtained by the process as claimed in claim 3.

7. A fiber, film, molding or coating produced from a carbon monoxide copolymer as claimed in claim 1.

8. A copolymer as claimed in claim 1, which is a terpolymer, and wherein the content of $C_2$- to $C_4$-monomer is from 10 to 50 mol % based on the copolymer.

* * * * *